United States Patent
Watson, Sr.

(10) Patent No.: US 6,314,916 B1
(45) Date of Patent: Nov. 13, 2001

(54) ROTARY TETHERING SYSTEM

(76) Inventor: Nelson A. Watson, Sr., 1019 E St., North Little Rock, AR (US) 72114

(*) Notice: Subject to any disclaimer, the term of this patent is extended or adjusted under 35 U.S.C. 154(b) by 0 days.

(21) Appl. No.: 09/432,996

(22) Filed: Nov. 2, 1999

(51) Int. Cl.$^7$ ..................................................... A01K 1/04
(52) U.S. Cl. .......................... 119/788; 119/791; 119/769
(58) Field of Search ..................................... 119/788, 783, 119/784, 712, 792, 856, 787, 786, 780, 769

(56) References Cited

U.S. PATENT DOCUMENTS

| | | | |
|---|---|---|---|
| 417,617 | * 12/1889 | Williams | 119/780 |
| 3,590,783 | * 7/1971 | Purgett | 119/783 |
| 3,921,589 | * 11/1975 | McGahee | 119/786 |
| 4,491,091 | * 1/1985 | Satterfield | 119/780 |
| 4,620,506 | * 11/1986 | Stubbs | 119/780 |
| 4,664,503 | * 5/1987 | Ibuchi | 399/391 |
| 5,226,829 | * 7/1993 | Jones | 135/118 |
| 5,732,659 | * 3/1998 | Wiggins | 119/787 |
| 5,957,092 | * 9/1999 | Colsch | 119/787 |

* cited by examiner

Primary Examiner—Charles T. Jordan
Assistant Examiner—Judith A. Nelson
(74) Attorney, Agent, or Firm—Joe D. Calhoun

(57) ABSTRACT

An improved system for tethering an animal in a desired region, comprising a bar perpendicular to a below ground stake section for anchoring and stabilizing the device; supporting an upper removable or detachable above ground shaft portion having a rotary tethering assembly intermediate between lower and upper bearing sections.

20 Claims, 2 Drawing Sheets

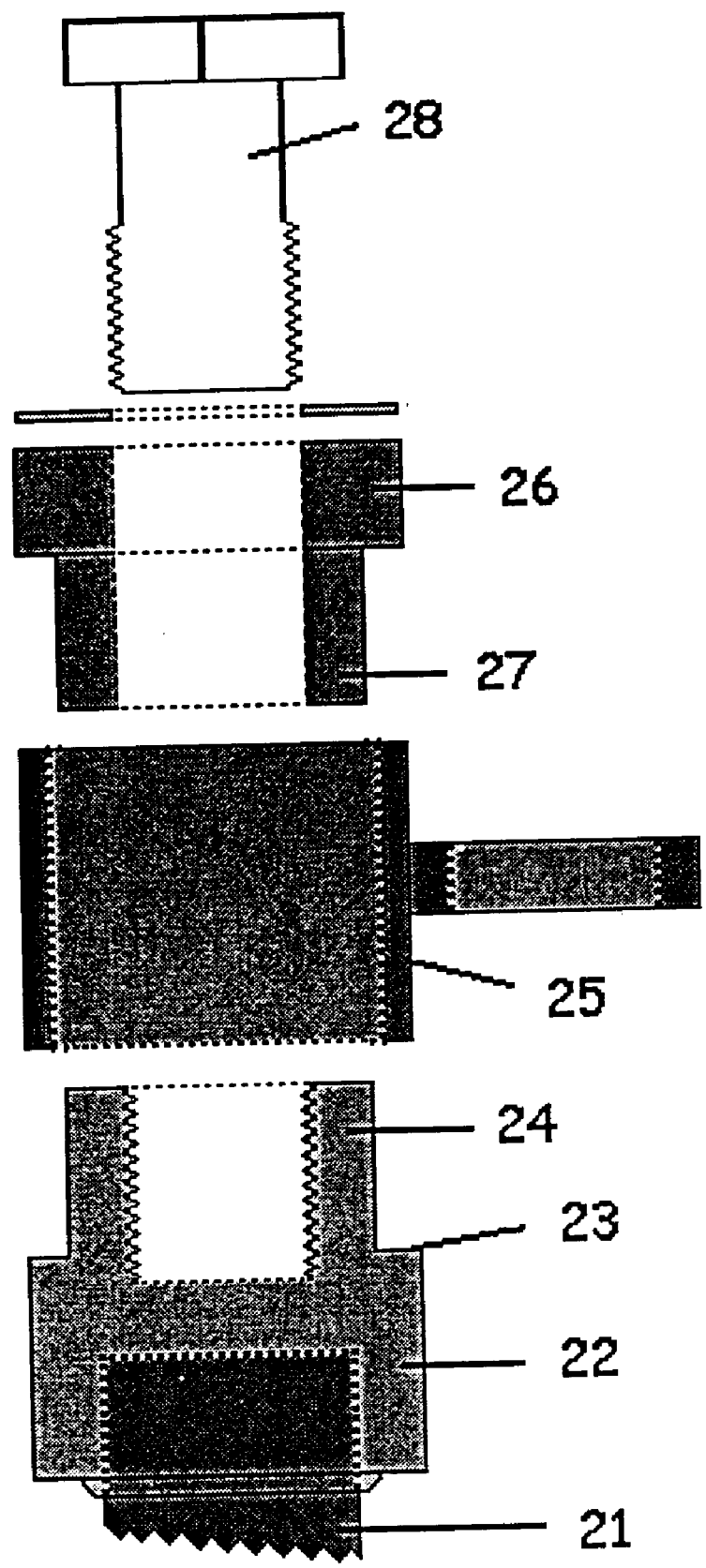

ROTARY TETHERING SYSTEM

CROSS REFERENCES TO RELATED APPLICATION

None.

STATEMENT REGARDING FEDERALLY SPONSORED RESEARCH OR DEVELOPMENT

Not Applicable.

BACKGROUND OF THE INVENTION

1. Field of the Invention

In most general terms, the present invention relates to restraining devices, especially those used to tether animals in a particular region. More particularly, it pertains to a new rotary animal tethering device. Even more particularly, the present invention relates to a rotary animal tethering device that, although anchored essentially permanently into the ground or other substratum, allows easy removal of the rotating head.

2. Description of Related Art

The following patents are known, and arguably related to the rotary above-ground portion of the present invention:

| Patent # | Issue Date | Inventor |
| --- | --- | --- |
| 4,620,506 | November 4, 1986 | Stubbs |
| 4,334,503 | June 15, 1982 | Carey |
| 5,732,659 | March 31, 1991 | Wiggins |
| 5,957,092 | September 28, 1999 | Colsch |
| 5,022,351 | June 11, 1991 | Daniels |
| 5,161,487 | November 10, 1992 | Miller |
| 4,491,091 | January 1, 1985 | Satterfield |
| 4,800,843 | January 31, 1989 | Wendling |
| 3,921,589 | November 25, 1975 | McGahee |
| 3,703,160 | November 21, 1972 | Biddle |

With respect to the anchoring system of the present invention, the following patents are known and arguably related:

| | | |
| --- | --- | --- |
| 5,226,829 | July 13, 1993 | Jones |
| 4,027,856 | June 7, 1977 | Kingsly, et al. |
| 4,553,358 | November 19, 1985 | Deike |
| 3,969,853 | July 20, 1976 | Deike |
| 4,921,200 | May 1, 1990 | Moraly |

BRIEF SUMMARY OF THE INVENTION

U.S. Pat. No. 4,620,506 issued to Stubbs (the "Stubbs Patent") discloses an externally threaded above-ground stake covered by an internally threaded tube, which in turn is surrounded by a freely rotatable cylinder having an eyelet for attachment of a tethering cord; a washer and nut holds the three-layered tethering system together. Although the Stubbs Patent allows a slight axial (upward) movement of the cylinder on the interior threaded tube, not much of said movement (if any) exceeds the length of said tube; otherwise, the cylinder would lose its positioning on the tube. Moreover, the Stubbs Patent does not disclose a rotary tethering device that is freely removable.

One primary object of the present invention is to provide a tethering system sufficiently anchored.

Another object is to provide a rotary tethering system that allows axial movement without disrupting the integrity of its bearing/bushing elements.

Another object of the invention is to provide a rotary tethering system that, once anchored securely in the ground, will allow detachment of the above-ground portion to allow for routine maintenance in the tethering region, or allow re-tethering to another anchored portion in another tethering region.

Another object is to provide a rotary tethering system that is relatively easy and economical to manufacture.

Another object is to provide a rotary tethering system that is virtually maintenance free.

Other objects of the invention will become apparent after reading the remainder hereof.

BRIEF DESCRIPTION OF DRAWINGS

The following describes the drawings accompanying this application, which are incorporated herein.

FIG. 2 depicts an exploded cross-section view of one version of the removable rotary tethering system comprising: at least one holding means including a lower stake portion (21); said holding means including an upper separable shaft assembly comprising:

Figure 1:
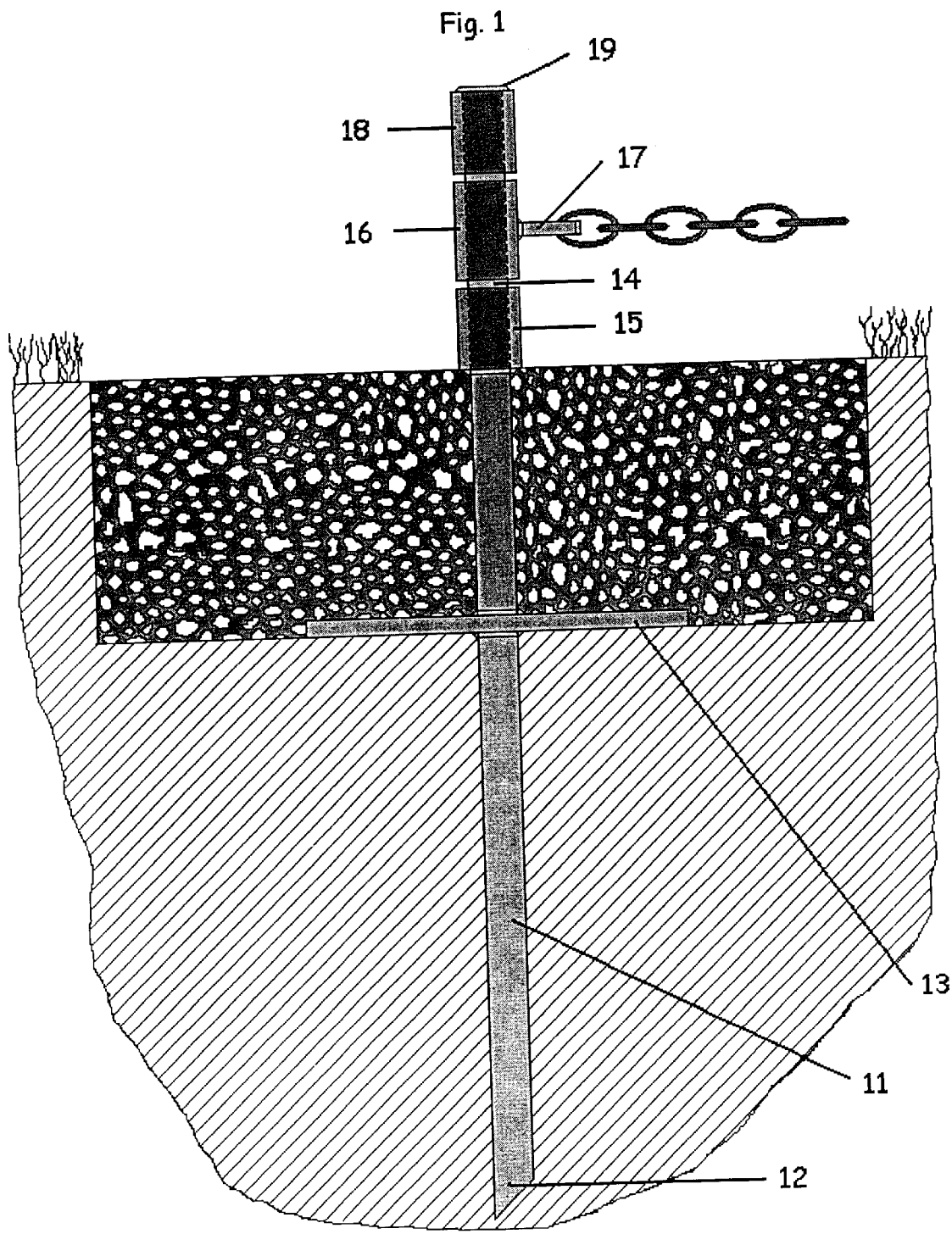
FIG. 1 depicts a cross-section view of one version of the rotary tethering system, already anchored and stabilized in the ground. This version includes an underground lower stake portion (11) (having a lowermost terminus (12) and a stabilizing means (13) transaxially connected to an intermediate stabilizing portion), an upper shaft portion (14) captured by a sleeve bearing (15) beneath an intermediate rotary collar (16) (with an eyelet ring, 17) beneath an upper sleeve bearing (18), terminating in a stop means (19).

(a) a lowermost bearing section (22) essentially permanently attached to said stake, including a weld nut (22) essentially permanently defining an uppermost terminus of said stake, and including a divergence (23) and an integral upstanding bushing segment (24) having an internally threaded longitudinal bore;

(b) removable rotary tethering means (25) comprising at least one rotary collar having at least one eyelet ring essentially permanently attached thereto;

(c) an upper bearing element having a divergence (26) and a downstanding bushing segment (27); and (d) connecting means (28) functionally connecting said lowermost bearing section and said removable rotary tethering means and said uppermost terminal section, and facilitating said removal of said rotary tethering means.

DETAILED DESCRIPTION OF THE INVENTION

For the sake of simplicity and to give the claims of this patent application the broadest interpretation and construction possible, the following definitions will apply:

1. The word axial or similar term essentially means of, related to, or along a hypothetical or imaginary axis extending longitudinally along the stake and/or shaft.

2. The word bearing essentially means a part that supports or constrains another machine part, and/or reduces the friction of motion between parts.

3. The word bushing essentially means a lining or covering of material used to reduce friction.

4. The word divergence essentially means departing or deviating outwardly from an established plane or course (as opposed to an inwardly deviating convergence); a divergence may be gradual or essentially instantaneous, such as (for example, without limitation) the cross-section diameter of a collar instantly increases, thereby essentially forming a ledge-like divergence.
5. The word integral essentially means essentially unitary construction, or constructed as an extension of the same element or component.
6. The word substratum essentially means ground or any other substance or combination(s) there of suitable for essentially anchoring a stake.
7. The word transaxial or similar term means of, related to, or along a hypothetical or imaginary plane extending essentially perpendicular to the axis extending essentially longitudinally along the stake and/or shaft.

Also for the sake of simplicity, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

The invention disclosed herein is not limited by construction materials to the extent that such materials satisfy the structural or functional requirements; for example, any materials may be used to make a stake portion or a shaft portion so long as such materials fulfill the requirements that the stake portion be able to essentially anchor the holding means into the ground or other substratum, and the shaft portion be able to essentially carry rotary tethering means above the ground. Preferred versions of the such portions disclosed herein may primarily be constructed from metal materials such as, for example (and not by way of limitation), steel, aluminum, titanium, brass, copper and alloys and other combinations thereof In very general terms, the present invention includes an improved system for tethering an animal in a desired region, comprising at least one holding means including a lower stake portion (for situating essentially underneath a desired substratum) and an upper shaft portion (extending essentially vertically, upwardly above the substratum), and at least one rotary tethering means essentially carried by said shaft portion. Said stake may include a lowermost section having an essentially diagonally truncated lowermost terminus, an upper anchoring section extending essentially vertically upwardly to the upper surface of the substratum, and an intermediate stabilizing section between said lower section and said upper anchoring section. Said intermediate stabilizing stake section may include stabilizing means selected from the group consisting of any essentially rigid member able to essentially attach permanently in transaxial relation to said lower stake section; said group may include such structural elements as bars, disks and polygonal plates, and combinations thereof. In one particular version of the invention, said stabilizing means includes at least one bar.

In another version of the invention, said system further includes means for permanently anchoring said stake portion in the substratum by situating said anchoring means atop said stabilizing means and essentially capturing said upper anchor section of said stake. Said stabilizing means may include concrete, cement, asphalt, gravel, and any type of material satisfying said functional requirements of stabilizing means.

In another version of the invention, said shaft portion may include an essentially cylindrical rod, while said rotary tethering means may include at least one rotary collar essentially impaled upon at least a segment of said cylindrical rod. In a particular embodiment, said rod may include an uppermost terminal section, a lowermost bearing section and a tethering section therebetween; said bearing section may include a shaft divergence sufficient to essentially carry said impaled rotary collar and facilitate rotation thereof. More particularly, said shaft divergence may include a sleeve bearing essentially permanently attached around the outer surface of said rod.

In another version of the invention, said uppermost terminal section may terminate in a stop means. Said stop means may be selected from the group consisting of terminal divergence, externally threaded terminus with a cooperating internally threaded nut, transaxial bore through said rod near said terminal accepting a cooperating impaling pin, transaxial bore through said rod near said terminal accepting a cooperating bolt with nut, or a sleeve essentially permanently attached around the outer surface of said rod, and combinations thereof. One of the important characteristics common to each of said members in said group, supporting the inclusion of each member in said particular group, is the ability to prevent the departure of any of the aforementioned elements from said uppermost terminal section. More particularly, said stop means may include a sleeve essentially permanently attached around the outer surface of said rod.

One preferred embodiment of an improved device for tethering in a desired region, especially for tethering one or more animals or similar items, includes:

(a) at least one holding means including a lower stake portion;
(b) said holding means including at least one upper separable shaft assembly comprising:
  (1) at least one lowermost bearing section essentially permanently attached to said stake, at least one uppermost terminal section, at least one removable rotary tethering means therebetween, and at least one connecting means functionally connecting said lowermost bearing section and removable rotary tethering means and uppermost terminal section, and facilitating said removal of said rotary tethering means;
  (2) said uppermost terminal section essentially terminating in stop means; and
  (3) said lower bearing section including, essentially attached permanently to an upper portion of said stake, at least one shaft divergence sufficient to essentially carry said rotary tethering means essentially impaled thereon and facilitate rotation thereof.

In a more particular version of said embodiment:
(a) said lowermost bearing section may include a weld nut essentially permanently defining an uppermost terminus of said stake, and include an integral upstanding bushing segment having an internally threaded axial bore;
(b) said removable rotary tethering means may include at least one rotary collar having an eyelet ring, or any other adaption allowing tethering, essentially permanently attached thereto;
(c) said connecting means may include a bolt having external threads acceptable to said internally threaded weld nut and sufficient length to impale said rotary collar when tautly threaded while allowing rotation thereof The length of said connecting means may allow for the axial movement of said collar(s) up said shaft, from a gravity-biased lower resting position up to a position higher on said shaft.

In one particular removable version of said embodiment: said separable shaft assembly includes an upper bearing element situated between said uppermost terminal section and said removable rotary tethering means. More particularly, said upper bearing element may include a stabilizing sleeve having at least one shaft divergence sufficient to essentially act as a stabilizing ceiling for said removable rotary tethering means essentially impaled thereon. Even more particularly, said stabilizing sleeve may include an integral downstanding bushing segment essentially coaxially alignable with said upstanding bushing segment of said lower bearing portion, said bushing segments essentially assembling collinearly and, depending upon the length of said connecting means and the tethering means, possibly defining an essentially continuous bushing separating said removable rotary tethering means and said connecting means.

Importantly, some versions of the invention include a bolt or other connecting means may have sufficient length to essentially allow or facilitate axial movement of said removable rotary tethering means from a gravity-biased resting position upward to a position higher up said shaft, even a position over twice as high as said removable rotary tethering means occupied in said resting position. In said versions, upward pressure of said tethering means (perhaps from upward pressure applied on the tethering collar by a tethered animal) against said shaft divergence essentially causes corresponding upward movement of said upper bearing element, thereby maintaining the relationship of said downstanding bushing segment with said removable rotary tethering means. At sufficient lessening or termination of said upward pressure, gravitational pull causes said removable rotary tethering means to return to its resting position, accompanied by said upper bearing element in functional relationship with said rotary tethering means.

Besides the various embodiments of the tethering system described herein, the present invention additionally includes a method of tethering an animal in a desired region. Said method may include the steps of:

(a) anchoring holding means (comprising a lower stake portion and an upper shaft portion) in a substrate, said stake portion including at least one rigid stabilizing means essentially attached permanently in transaxial relation to said lower stake portion, said anchor means including an upper shaft portion (extending essentially upwardly above the substratum), and at least one rotary tethering means essentially carried by said shaft portion;

(b) situating anchoring means in cooperating relationship to said stabilizing means; and (c) tethering an animal to said rotary tethering means.

In another invented method, said upper shaft portion may include a separable shaft assembly comprising a lowermost bearing section essentially permanently attached to said stake, an uppermost terminal section, a removable rotary tethering means therebetween, and a connecting means functionally connecting said lowermost bearing section and removable rotary tethering means and uppermost terminal section, and facilitating said removal of said rotary tethering means. Said uppermost terminal section may essentially terminate in stop means; and said lower bearing section may include, essentially attached permanently to an upper portion of said stake, at least one shaft divergence sufficient to essentially carry said rotary tethering means essentially impaled thereon and facilitate rotation thereof Said method may further include the step of removing said connecting means and disconnecting said shaft portion from said stake portion. Said method may further include reconnecting said shaft section to the same or to a different stake section, and reconnecting said connecting means.

Those skilled in the art who have the benefit of this disclosure will appreciate that it may be used as the creative basis for designing devices or methods similar to those disclosed herein, or to design improvements to the invention disclosed herein; such new or improved creations should be recognized as dependant upon the invention disclosed herein, to the extent of such reliance upon this disclosure.

What is claimed is:

1. An improved system for tethering in a desired region, comprising at least one holding means including a lower stake portion and an upper shaft portion including a non-threaded upper section facilitating carriage of the rotary tethering means axially upward along said shaft more than a slight distance, and at least one rotary tethering means essentially carried by said shaft section.

2. An improved tethering system as described in claim 1 above, said stake comprising a lowermost section having an essentially diagonally truncated lowermost terminus, an upper extension section extending essentially to the upper surface of the substratum, and an intermediate stabilizing section between said lower section and said upper extension section.

3. An improved tethering system as described in claim 2 above, said intermediate stabilizing stake section comprising stabilizing means selected from the group consisting of bars, disks and polygonal plates, and combinations thereof.

4. An improved tethering system as described in claim 3 above, said stabilizing means comprising at least one bar.

5. An improved tethering system as described in claim 4 above, said system further comprising means for permanently anchoring said stake portion in the substratum by situating said anchoring means atop said stabilizing means and essentially capturing said upper extension section of said stake.

6. An improved tethering system as described in claim 5 above, said stabilizing means comprising concrete cement.

7. An improved tethering system as described in claim 1 above, said shaft portion comprising an essentially cylindrical rod, said rotary tethering means comprising at least one rotary collar essentially impaled upon at least a segment of said cylindrical rod.

8. An improved tethering system as described in claim 7 above, said rod comprising an uppermost terminal section, a lowermost bearing section and a tethering section therebetween, said bearing section including a shaft divergence sufficient to essentially carry said impaled rotary collar and facilitate rotation thereof.

9. An improved tethering system as described in claim 8 above, said shaft divergence comprising a sleeve bearing essentially permanently attached around the outer surface of said rod.

10. An improved tethering system as described in claim 8 above, said uppermost terminal section terminating in a stop means.

11. An improved tethering system as described in claim 10 above, said stop means are selected from the group consisting of terminal divergence, externally threaded upper terminus with a cooperating internally threaded nut, transaxial bore through said rod near said upper terminal accepting a cooperating impaling pin, transaxial bore through said rod near said upper terminal accepting a cooperating bolt with nut, or a sleeve essentially permanently attached around the outer surface of said rod, and combinations thereof.

12. An improved tethering system as described in claim 11 above, said stop means comprising a sleeve essentially permanently attached around the outer surface of said rod.

13. An improved device for tethering in a desired region, comprising:

(a) at least one holding means including a lower stake portion;

(b) said holding means including an upper detachable shaft assembly including a non-threaded upper section facilitating carriage of the rotary tethering means axially upward along said shaft more than a slight distance, said shaft assembly comprising:
  (1) a lowermost bearing section essentially permanently attached to said stake, an uppermost terminal section, removable rotary tethering means therebetween, and connecting means functionally connecting said lowermost bearing section and said removable rotary tethering means and said uppermost terminal section, and facilitating said removal of said rotary tethering means;
  (2) said uppermost terminal section essentially terminating in stop means; and
  (3) said lower bearing section including, essentially attached permanently to an upper portion of said stake, at least one shaft divergence sufficient to essentially carry said removable rotary tethering means essentially impaled thereon and facilitate rotation thereof.

14. An improved tethering system as described in claim 13 above, wherein:
  (a) said lowermost bearing section comprising a weld nut essentially permanently defining an uppermost terminus of said stake, and including an integral upstanding bushing segment having an internally threaded axial bore;
  (b) said removable rotary tethering means comprising at least one rotary collar having an eyelet ring essentially permanently attached thereto;
  (c) said connecting means comprising a bolt having external threads acceptable to said internally threaded weld nut and sufficient length to impale said rotary collar when tautly threaded while allowing rotation thereof.

15. An improved tethering system as described in claim 14 above, wherein said separable shaft assembly includes an upper bearing element situated between said uppermost terminal section and said removable rotary tethering means.

16. An improved tethering system as described in claim 15 above, wherein said upper bearing element comprises a stabilizing sleeve having at least one shaft divergence sufficient to essentially act as a stabilizing ceiling for said removable rotary tethering means essentially impaled thereon.

17. An improved tethering system as described in claim 16 above, wherein said stabilizing sleeve includes an integral downstanding bushing segment essentially coaxially alignable with said upstanding bushing segment of said lower bearing section.

18. A method of tethering in a desired region, comprising the steps of:
  anchoring holding means comprising a lower stake section and an upper shaft section in a substrate, said stake section including at least one rigid stabilizing means essentially attached permanently in transaxial relation to said lower stake section, said anchoring holding means including an upper shaft section including a non-threaded upper section facilitating carriage of a rotary tethering means axially upward along said shaft more than a slight distance, and at least one rotary tethering means essentially carried by said shaft section;
  situating anchoring means in cooperating relationship to said stabilizing means; and
  tethering to said rotary tethering means.

19. A method of tethering in a desired region as described in claim 18 above:
  wherein, said upper shaft section including a detachable shaft assembly comprising:
    (A) a lowermost bearing section essentially permanently attached to said stake, an uppermost terminal section, removable rotary tethering means therebetween, and connecting means functionally connecting said lowermost bearing section and said removable rotary tethering means and said uppermost terminal section, and facilitating said removal of said rotary tethering means;
    (B) said uppermost terminal section essentially terminating in stop means; and
    (C) said lower bearing section including, essentially attached permanently to an upper section of said stake, at least one shaft divergence sufficient to essentially carry said removable rotary tethering means essentially impaled thereon and facilitate rotation thereof;
  and further comprising the step of removing said connecting means and disconnecting said shaft section from said stake section.

20. A method of tethering in a desired region as described in claim 19 above, further comprising the step of reconnecting said shaft section to a different stake section, and reconnecting said connecting means.

* * * * *